Figure 1:
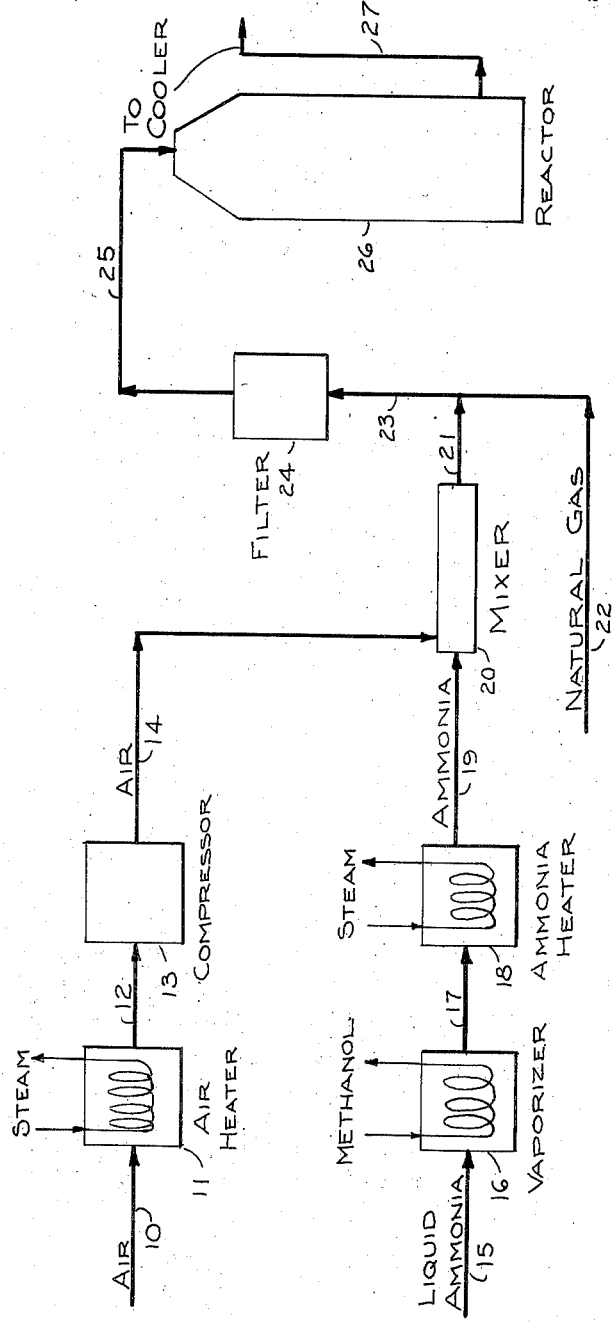

INVENTOR.
BYRON N. INMAN
BY James H. Ryan
ATTORNEY

United States Patent Office 2,803,522
Patented Aug. 20, 1957

2,803,522

MANUFACTURE OF HYDROGEN CYANIDE

Byron N. Inman, Tonawanda, N. Y., assignor to E. I. du Pont de Nemours and Company, Wilmington, Del., a corporation of Delaware Application April 15, 1953, Serial No. 348,995

5 Claims. (Cl. 23—151)

This invention relates to the manufacture of hydrogen cyanide and, more particularly, to the manufacture of hydrogen cyanide by reaction between air, ammonia and natural gas.

The one-stage synthesis of hydrocyanic acid from ammonia and natural gas, heat therefor being supplied by the simultaneous combustion of more of the natural gas, is a development of the last few decades. Andrussow U. S. P. 1,934,838 (1933), for example, developed a process in which the reaction described was carried out over a platinum metals catalyst. Other processes utilizing the same general reactions have also been developed including that of Carlisle et al. U. S. P. 2,069,545 (1937) and that of Houpt et al. U. S. P. 2,496,999 (1950).

In general, the single-stage processes developed heretofore have been quite efficient, producing hydrogen cyanide in good yield more cheaply than was possible by use of previously known processes. Impurities, however, may be introduced with the reactants into the reactor and consequently into the product hydrogen cyanide unless precautions are taken to remove them before the reaction takes place. Filtering to remove dust and other solids suspended in the input gases is one obvious method for purifying materials. Filtering is also essential to remove iron particles caught up in the gas stream from the piping used since iron is a poison for the platinum metals catalyst. Generally, the input gases have been filtered separately because the ammonia reacts with carbon dioxide and water vapor in the air and natural gas to yield solids which clog up the filters. The solids produced include urea and carbamates in addition to the expected ammonium carbonate. The filtration problem becomes particularly acute when some of the ammonia utilized is recycled from a previous passage through the platinum catalyst and, though purified of hydrogen cyanide, contains a high percentage of carbon dioxide.

A primary object of this invention is to develop a new and useful process for making hydrogen cyanide. Another object is to develop a process for making gaseous hydrogen cyanide from purified reactants. A further object of the invention is development of a process for purifying the reactants used in making hydrogen cyanide from air, a hydrocarbon-containing gas and ammonia. An additional object of the invention is development of a method for filtering a mixture of ammonia, hydrocarbon and air. Another object of the invention is development of a method for filtering ammonia and gases containing carbon dioxide and water vapor jointly rather than separately and thereby simplifying the filtering system required. Still another object of the invention is development of a catalytic process for making hydrogen cyanide from ammonia, a hydrocarbon and air in which unreacted ammonia can be filtered and recycled through the catalyst although contaminated with a high percentage of carbon dioxide.

Figure 2:
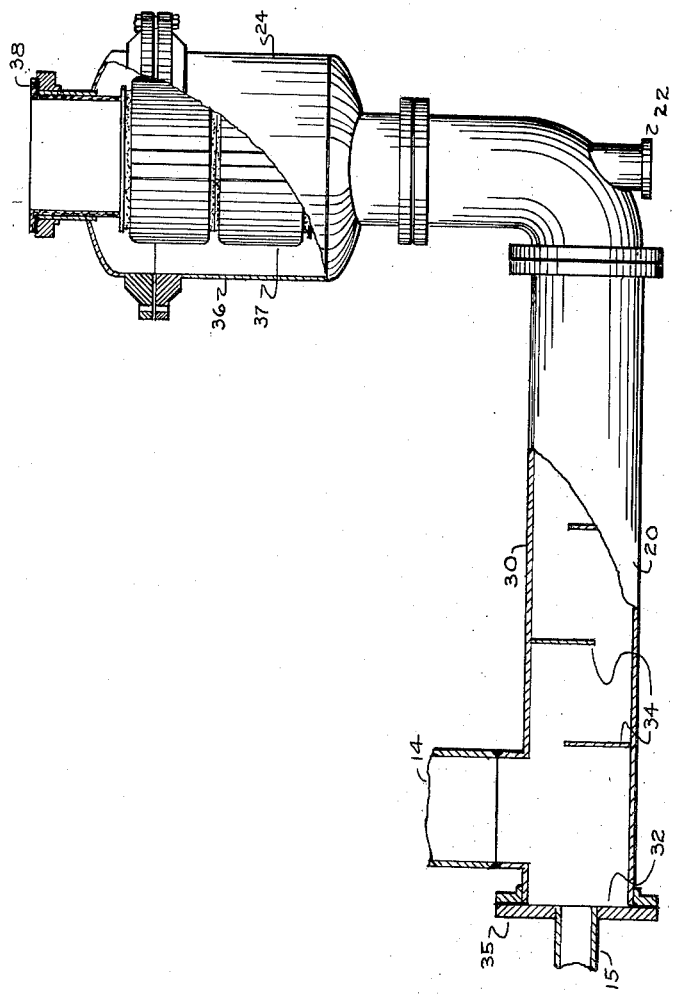

I have found that the above-enumerated and further objects of the invention can be achieved by a process which includes the step of filtering the reactants while they are at a temperature of at least about 60° C., and preferably 70°–120° C. If filtration temperatures within the 60°–120° C. range are employed, the filtration can be accomplished without any danger of forming ammonium carbonate or other solids which would clog up any filters employed. Details of the invention may be understood from the remainder of this specification and from the appended drawings, herein incorporated by reference, in which:

Figure 1 is a schematic diagram of the apparatus required for carrying out the invention and the direction of flow of the reactants; and Figure 2 is a sectional view of the mixer and filter shown on the diagram of Figure 1.

Figure 1 shows air being taken into the system through line 10 into a preliminary heater 11 which may be steam-operated or of any other convenient type. The major portion of the heating necessary for this invention is carried in heater 11 and it should have the capacity to raise the final temperature of the air to 70° C. or more. Since air forms the bulk of the gaseous reactants employed, 70°–80° C. will normally be enough to hold the entire reactant mass at 60° C. or above. Higher temperatures are desirable, however, so the air should preferably be heated to around 100° C. Through line 12 the air is taken to compressor 13 and, through line 14, to mixer 20. Compressor 13 can aid to some extent in bringing the air temperature to the requisite level. Preheating is necessary though if 70°–100° C. is to be maintained. The preheater may also be installed downstream of the compressor, if desired.

Through line 15 liquid ammonia, preferably anhydrous, is brought to vaporizer 16. This vaporizer is essentially a heat exchanger utilizing methanol instead of water as the heat-exchange fluid to avoid freezing of the fluid. Superheater 18, connected to the vaporizer through line 17, raises the temperature of the gaseous ammonia to 60°–120° C., and passes it along through line 19 to the mixer 20 where it joins the air stream. The volume of air employed is much greater than that of the ammonia. The temperature of the latter is consequently not particularly critical if the air is hot enough. For best results the ammonia should, however, be at a minimum of about 50° C. when it enters the mixer.

In mixer 20 the air and ammonia are thoroughly mixed at temperatures between about 60° and 120° C. If the conditions specified are carefully maintained, no trace appears of the white ammonia addition products and the mixer can be operated indefinitely without clogging. From the mixer the heated ammonia and air are conducted through lines 21 and 23 to filter 24. A carbonaceous gas, generally natural gas, is forced into the system through line 22 joining line 23. Since the natural gas is admitted at ambient temperature, the mixture coming through pipe 21 must be somewhat hotter than the 60° C. or, preferably, 70° C. required for the filtration. For best results the mixed gases in line 21 should be at 70°–120° C. The gases flow from line 23 into filter 24 where the filtration is accomplished. This step removes dust and other solid particles brought into the system primarily with the air and natural gas. The filtered gases pass from filter 24 through line 25 to reactor 26. In this reactor the gases may be forced through a catalyst (not shown) such as a porous base carrying one or more of the platinum metals and reacted. The product gases contain about 6% hydrogen cyanide, around 2% unreacted ammonia, 10% carbon monoxide, 14% hydrogen and a small percentage of carbon dioxide, the remainder consisting largely of nitrogen and water vapor. These gases are conducted out of the system through line 27 for cooling, separation and further processing by known steps as desired. The unreacted ammonia can be recovered and recycled through the gas mixing system of this invention. It can readily be introduced into either line 17 or line 19 by a connection (not shown) extending from the cooler or separator. The large quantities of carbon dioxide present in the recovered ammonia are rendered harmless by the filtering temperatures employed.

Figure 2 shows details of construction for mixer 20 and filter 24. The mixer consists essentially of an elongated cylindrical casing 30 carrying an internal baffle assembly 34. End 32 is closed by reducing flange 35. Ammonia is admitted through port 33 and air through port 31. Filter 24 comprises essentially a cylindrical metal casing 36 enveloping a conventional porous fabric filter medium 39 such as glass-fiber, wool felt or the like supported on a metal framework 37 preferably of aluminum but necessarily of a material non-toxic to the catalyst. Liner 38, also formed of aluminum or other metal non-toxic to the catalyst, must be used in the gas lines after the filter.

By following the precepts of this invention, that is, by mixing and filtering the reaction gases at a temperature of at least about 60° C. and preferably in the range 70°–120° C., the formation of carbonates and other products which would plug the lines may be avoided. Use of this invention renders it unnecessary to provide a separate filter for each of the reactant gases. The single filter shown will operate for many hours without being changed.

In actual operation, a mixture of gases was passed through a filter such as that described and having an internal area of 133 square feet with a linear velocity of 40 ft./min. and a pressure of about 30 lbs. absolute. The molar feed ratio of natural gas:air:ammonia was 1.7:9:1. The air was heated to 70°–100° C. and the temperature within the filter maintained at at least 70° C. The effluent gases from the reactor contained about 6% hydrogen cyanide, 2% ammonia, some carbon dioxide and a large proportion of inert materials. The ammonia was continuously recovered from the product gases and recycled through the filter system although it contained a high percentage of carbon dioxide. The filter operated without change for at least 350 hours. In contrast with this result, a filter of the type shown cannot be operated at normal temperatures with an ammonia-air-hydrocarbon bearing gas mixture for any length of time if even small amounts of carbon dioxide are present. Clogging of the filter medium will inevitably result within a very few hours.

Some modifications in the system of this invention will be evident to those skilled in the art. The exact order of mixing the gases shown in this invention is not, for example, absolutely essential. Natural gas or methane can be mixed with either the air or ammonia before the third component is added. The procedure described, i. e., first mixing ammonia and air and then adding natural gas, affords the simplest means of determining and controlling the composition of the reactor input gases and is, for that reason, preferred. It is, furthermore, possible to heat the filter rather than preheat the gases passed therethrough. This heating can be accomplished as by a steam jacket (not shown) surrounding the filter. The heat transfer characteristics of gases are such, however, that sufficient heating in the filter becomes very difficult to accomplish, particularly at the high space velocities desired here. Preheating the reaction gases before filtering, as described, is consequently preferred. In any event, it may be desirable to add lagging externally to the filter to prevent excessive heat losses.

Having now described my invention, I claim:

1. In the manufacture of hydrogen cyanide by the vapor phase reaction between air, ammonia and a gaseous hydrocarbon, the steps comprising mixing said reactants at a temperature above about 60° C., thereby avoiding the formation of carbonates and the like, and filtering the mixed reactants without lowering the temperature thereof.

2. The invention of claim 1 in which the temperature is 70°–120° C.

3. The invention of claim 2 in which the temperature is obtained by preheating the air.

4. The process for making hydrogen cyanide which comprises heating air to a temperature of about 70°–120° C., adding ammonia and a gaseous hydrocarbon to the air without reducing the temperature of the resultant mixture to less than about 60° C., the mole ratio of gases in said mixture being around 9:1:2 air:ammonia:hydrocarbon, filtering said mixture at a temperature above about 60° C., thereby avoiding the formation of carbonates and the like and concomitant clogging of the filter employed, reacting the filtered mixture at elevated temperature over a catalyst chosen from the platinum metals, and subsequently recovering hydrogen cyanide from the reacted mixture.

5. The process of claim 4 in which hydrogen cyanide is separated from unreacted ammonia and the latter is recycled to the air:ammonia:hydrocarbon reaction mixture.

References Cited in the file of this patent

UNITED STATES PATENTS

| | | |
|---|---|---|
| 1,789,580 | De Jahn | Jan. 20, 1931 |
| 1,872,638 | Heckenbleikner | Aug. 16, 1932 |
| 2,069,545 | Carlise et al. | Feb. 2, 1937 |
| 2,584,080 | Houpt | Jan. 29, 1952 |
| 2,656,251 | Christmann et al. | Oct. 20, 1953 |

OTHER REFERENCES

Thorne et al.: "Inorganic Chemistry," 4th edition (1943), Nordeman Publishing Company, Inc., New York, N. Y., page 810.